(12) United States Patent
Liu

(10) Patent No.: US 9,637,154 B2
(45) Date of Patent: May 2, 2017

(54) HINGE ASSEMBLY FOR FOLDING STROLLER

(71) Applicant: Britax Child Safety Inc., Fort Mill, SC (US)

(72) Inventor: Zhenqiang Liu, Zhuhai (CN)

(73) Assignee: BRITAX CHILD SAFETY, INC., Fort Mill, SC (US)

( * ) Notice: Subject to any disclaimer, the term of this patent is extended or adjusted under 35 U.S.C. 154(b) by 0 days.

(21) Appl. No.: 14/707,058

(22) Filed: May 8, 2015

(65) Prior Publication Data
US 2015/0344058 A1    Dec. 3, 2015

(30) Foreign Application Priority Data

May 29, 2014 (CN) ...................... 2014 2 0283965 U

(51) Int. Cl.
*B62B 7/06* (2006.01)
*E05D 11/10* (2006.01)
*B62B 7/04* (2006.01)

(52) U.S. Cl.
CPC .......... *B62B 7/062* (2013.01); *E05D 11/1007* (2013.01); *B62B 7/044* (2013.01);
(Continued)

(58) Field of Classification Search
CPC .. B62B 7/00; B62B 7/06; B62B 7/062; B62B 7/064; B62B 7/044; B62B 2205/18; B62B 2205/20
See application file for complete search history.

(56) References Cited

U.S. PATENT DOCUMENTS 5,775,460 A * 7/1998 Stone ........................ E06C 1/12
16/354
6,102,431 A   8/2000 Sutherland et al.
(Continued)

FOREIGN PATENT DOCUMENTS

CN   2905586 Y    5/2007
CN   202529014 U  11/2012
(Continued)

OTHER PUBLICATIONS

Extended European Search Report and Written Opinion of corresponding European application No. 15001179.9, mailed Dec. 10, 2015.
(Continued)

*Primary Examiner* — Frank Vanaman
(74) *Attorney, Agent, or Firm* — Nelson Mullins Riley & Scarborough LLP

(57) ABSTRACT

A stroller which may be folded or collapsed for storage purposes and a hinge for facilitating the stroller folding. The hinge includes a housing, a first pivoting hinge member that is pivotally connected to the housing, and a second pivoting hinge member that is pivotally connected to the housing. The first pivoting hinge member may be connected to the second pivoting hinge member, such as by a linking member, so that the pivoting hinge members rotate in opposite directions. The hinge may also include a slide member having a pin that may move between a locked position and an unlocked position. In the locked position, the slide member engages protrusions on one or both of the pivoting hinge members in order to hold the hinge in an operational position.

19 Claims, 17 Drawing Sheets

(52) U.S. Cl.
CPC .......... *B62B 7/064* (2013.01); *B62B 2205/20* (2013.01); *B62B 2205/24* (2013.01); *Y10T 16/54* (2015.01)

(56) References Cited

U.S. PATENT DOCUMENTS

| | | | | |
|---|---|---|---|---|
| 7,237,795 B2* | 7/2007 | Wu | ............ | B62B 3/12 280/651 |
| 8,282,120 B2* | 10/2012 | Minato | ............ | B62B 7/062 280/47.38 |
| 2011/0084467 A1* | 4/2011 | Liao | ............ | B62B 7/062 280/642 |
| 2012/0187660 A1* | 7/2012 | Liao | ............ | B62B 7/086 280/642 |
| 2013/0257019 A1* | 10/2013 | Eisinger | ............ | B62B 7/06 280/650 |
| 2013/0340205 A1 | 12/2013 | Chuah | | |
| 2014/0167393 A1* | 6/2014 | Tsai | ............ | B62B 7/08 280/650 |

FOREIGN PATENT DOCUMENTS

| | | |
|---|---|---|
| CN | 202935408 U | 5/2013 |
| CN | 203094146 U | 7/2013 |
| CN | 203318470 U | 12/2013 |
| CN | 102424065 B | 5/2014 |
| CN | 203753214 U | 8/2014 |
| EP | 2502801 A1 | 9/2012 |
| JP | S319907 | 6/1956 |
| JP | S5842654 Y2 | 9/1983 |
| JP | H08105433 A | 4/1996 |
| SU | 1281465 A1 | 1/1987 |
| WO | 2010091513 A1 | 8/2010 |

OTHER PUBLICATIONS

Patent Examination Report No. 1 in corresponding Australian application No. AU 2015202702, issued Oct. 30, 2015.
Examination report of corresponding Japanese application No. 2015-080582 dispatched Mar. 7, 2016.
Office action from corresponding Russian application No. 2015117974 mailed Oct. 4, 2016.
Office action from corresponding Japanese application No. 2015-080582 mailed Nov. 2, 2016.

\* cited by examiner

HINGE ASSEMBLY FOR FOLDING STROLLER

TECHNICAL FIELD OF THE INVENTION

The present invention relates generally to a folding stroller, and more particularly, to a folding stroller having one or more hinges that allow the stroller to be folded when not in use.

BACKGROUND

In general, strollers are wheeled devices used to transport a passenger, typically a child. Some strollers may be configured to fold or collapse when not in use in order to occupy less space. Applicant has identified a number of deficiencies and problems associated with conventional folding strollers and associated hardware. Through applied effort, ingenuity, and innovation, many of these identified problems have been solved by developing solutions that are included in embodiments of the present invention, many examples of which are described in detail herein.

BRIEF SUMMARY OF THE INVENTION

Strollers may be designed to fold or collapse in order to allow a user to store or transport the stroller more easily. Some strollers may include hinges in one or more locations along their frames in order to facilitate the folding or collapsing of the stroller. The hinges may allow the stroller to fold easily while also being able to maintain the stroller in an operational position to receive a passenger. Accordingly, embodiments of the present invention described herein relate to an improved hinge for a stroller and strollers having one or more such hinges.

In some embodiments, a hinge for a stroller may include a housing. Some embodiments of the hinge include a first pivoting hinge member that may be pivotally connected to the housing. In some embodiments, the first pivoting hinge member includes a first protrusion. Additionally or alternatively, a second pivoting hinge member may be provided that is pivotally connected to the housing. In some embodiments, the second pivoting hinge member may include a second protrusion. The hinge may include a linking member pivotally attached to the first pivoting hinge member and the second pivoting hinge member such that the first and second pivoting hinge members are configured to rotate substantially simultaneously in opposite directions in a plane. In some embodiments, the hinge includes a slide member that may be at least partially received within the housing. The slide member may define a longitudinal axis and may be configured to move along the longitudinal axis between a locked position and an unlocked position. In some embodiments, the slide member may be configured to engage at least one of the first protrusion or the second protrusion in the locked position. Some embodiments of the locked position may include the first pivoting hinge member and the second pivoting hinge member being pivotally fixed with respect to each other.

In some embodiments, the slide member may define a pin at an end of the slide member proximate the first and second pivoting hinge members such that the pin may engage at least one of the first protrusion or the second protrusion in the locked position.

In some embodiments, the linking member may define a first end and a second end. The first end may be pivotally connected to the first pivoting hinge member and the second end may be pivotally connected to the second pivoting hinge member.

Some embodiments of the hinge may include the first pivoting hinge member defining a first axis of rotation and the second pivoting hinge member defining a second axis of rotation. The first axis of rotation may be parallel to the second axis of rotation.

In some embodiments, the slide member may be biased toward the locked position by a biasing member. In some embodiments, the slide member may be configured to be moved from the locked position to the unlocked position by a release member on the stroller. The release member may be actuatable by a user.

In some embodiments, the first pivoting hinge member may define a first engaging end and the second pivoting hinge member may define a second engaging end. The first engaging end may be configured to engage a first support of the stroller and the second engaging end may be configured to engage a second support of the stroller. The housing may be configured to engage a center support of the stroller.

In some embodiments, the slide member may be configured to slide along the longitudinal axis within the center support of the stroller. In some embodiments, the first and second pivoting hinge members may be configured to move between an operational position, in which the hinge may be configured to extend the first and second supports of the stroller in opposite directions, and a folded position in which the hinge may be configured to dispose the first and second supports proximate the slide member.

In some embodiments, the first pivoting hinge member may include at least one guide slot defined in a first perimeter surface of the first pivoting hinge member and the second pivoting hinge member may include at least one guide feature defined in a second perimeter surface. The at least one guide slot may be configured to slidingly engage the at least one guide feature. In some embodiments, the at least one guide slot and the at least one guide feature may cooperate to define a limiting position of the hinge. In some embodiments of the limiting position, the at least one guide slot and the at least one guide feature may engage to preclude rotation of each of the first and second pivoting hinge members in at least one respective rotational direction.

Some embodiments of the hinge may include a secondary locking mechanism that may be configured to hold the slide member in the locked position. The secondary locking mechanism may be configured to be released upon actuation by the user.

In some other embodiments of the present invention, a foldable stroller may be provided that may include a front-wheel support, a rear-wheel support, a handle support, and/or a pair of hinges. In some embodiments, the pair of hinges may connect the front-wheel support, the rear-wheel support, and the handle support such that the stroller is movable between an operational position and a folded position. Some embodiments of each hinge may include a housing. Some embodiments of each hinge may include a first pivoting hinge member that may be pivotally connected to the housing. In some embodiments, the first pivoting hinge member includes a first protrusion. Additionally, or alternatively, a second pivoting hinge member may be provided that is pivotally connected to the housing. In some embodiments, the second pivoting hinge member may include a second protrusion. Each hinge may include a linking member pivotally attached to the first pivoting hinge member and the second pivoting hinge member such that the first and second pivoting hinge members are configured to rotate substantially simultaneously in opposite directions in a plane. In some embodiments, each hinge may include a slide member that may be at least partially received within the housing. The slide member may define a longitudinal axis and may be configured to move along the longitudinal axis between a locked position and an unlocked position. In some embodiments, the slide member may be configured to engage at least one of the first protrusion or the second protrusion in the locked position. Some embodiments of the locked position may include the first pivoting hinge member and the second pivoting hinge member being pivotally fixed with respect to each other.

In some embodiments, the slide member of each hinge may define a pin at an end of the slide member proximate the first and second pivoting hinge members such that the pin may engage at least one of the first protrusion or the second protrusion in the locked position.

In some embodiments, the linking member of each hinge may define a first end and a second end. The first end may be pivotally connected to the first pivoting hinge member and the second end may be pivotally connected to the second pivoting hinge member.

In some embodiments of each hinge, the first pivoting hinge member may define a first axis of rotation and the second pivoting hinge member may define a second axis of rotation. In some embodiments, the first axis of rotation may be parallel to the second axis of rotation.

In some embodiments, the slide member of each hinge may be biased toward the locked position by a biasing member. In some embodiments, the slide member of each hinge may be configured to be moved from the locked position to the unlocked position by a release member on the stroller. The release member may be actuatable by a user.

In some embodiments, each hinge may include a lever pivotally connected to one of the first or second pivoting hinge members. The lever may be configured to maintain the slide member in the unlocked position when the first and second pivoting hinge members are in the folded position. In some embodiments, the lever of each hinge may be configured to be disengaged from the slide member to allow the slide member to move toward the locked position when the first and second pivoting hinge members are moved toward the operational position.

BRIEF DESCRIPTION OF THE DRAWINGS

Figure 1:
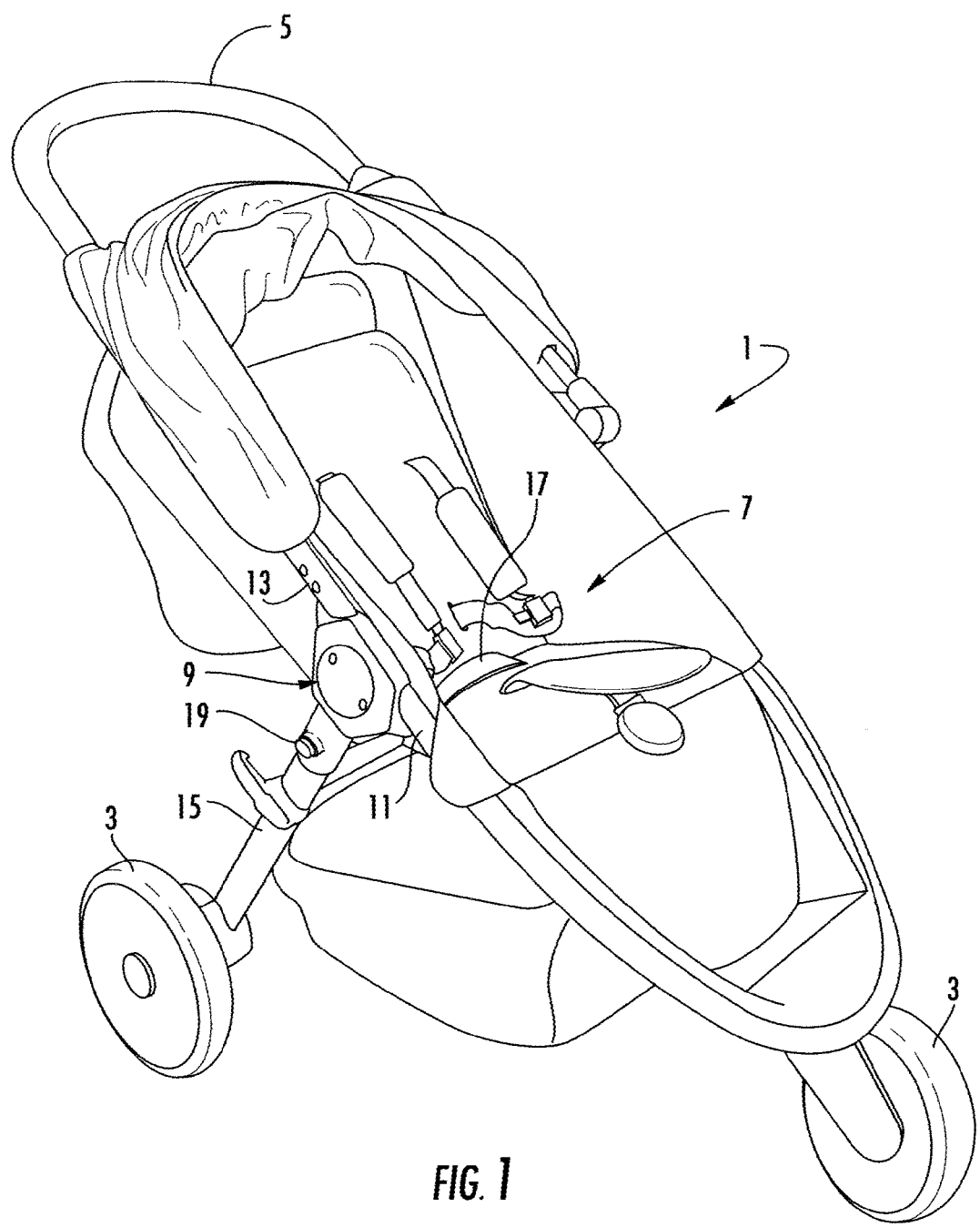
Figure 2:
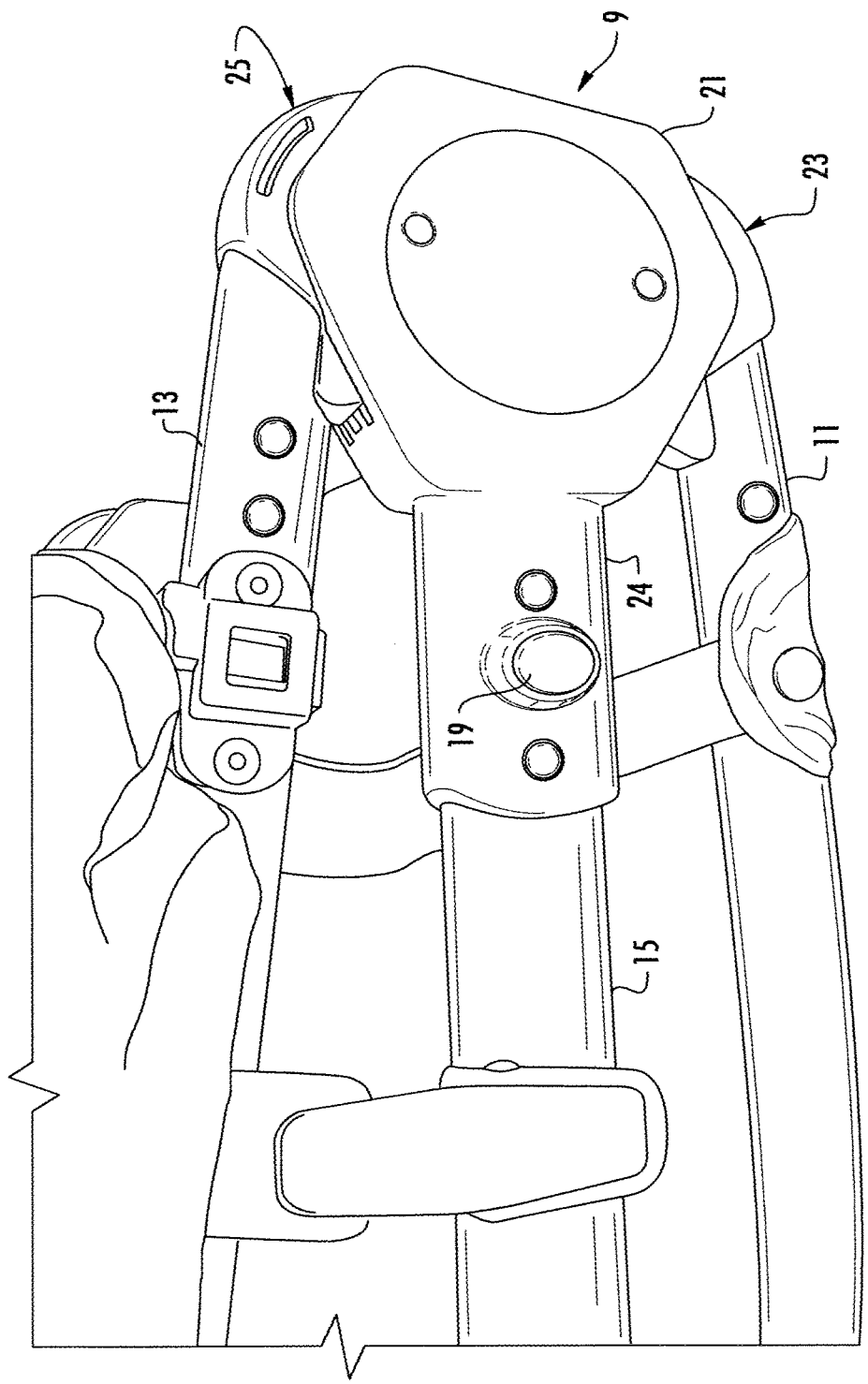
Figure 3:
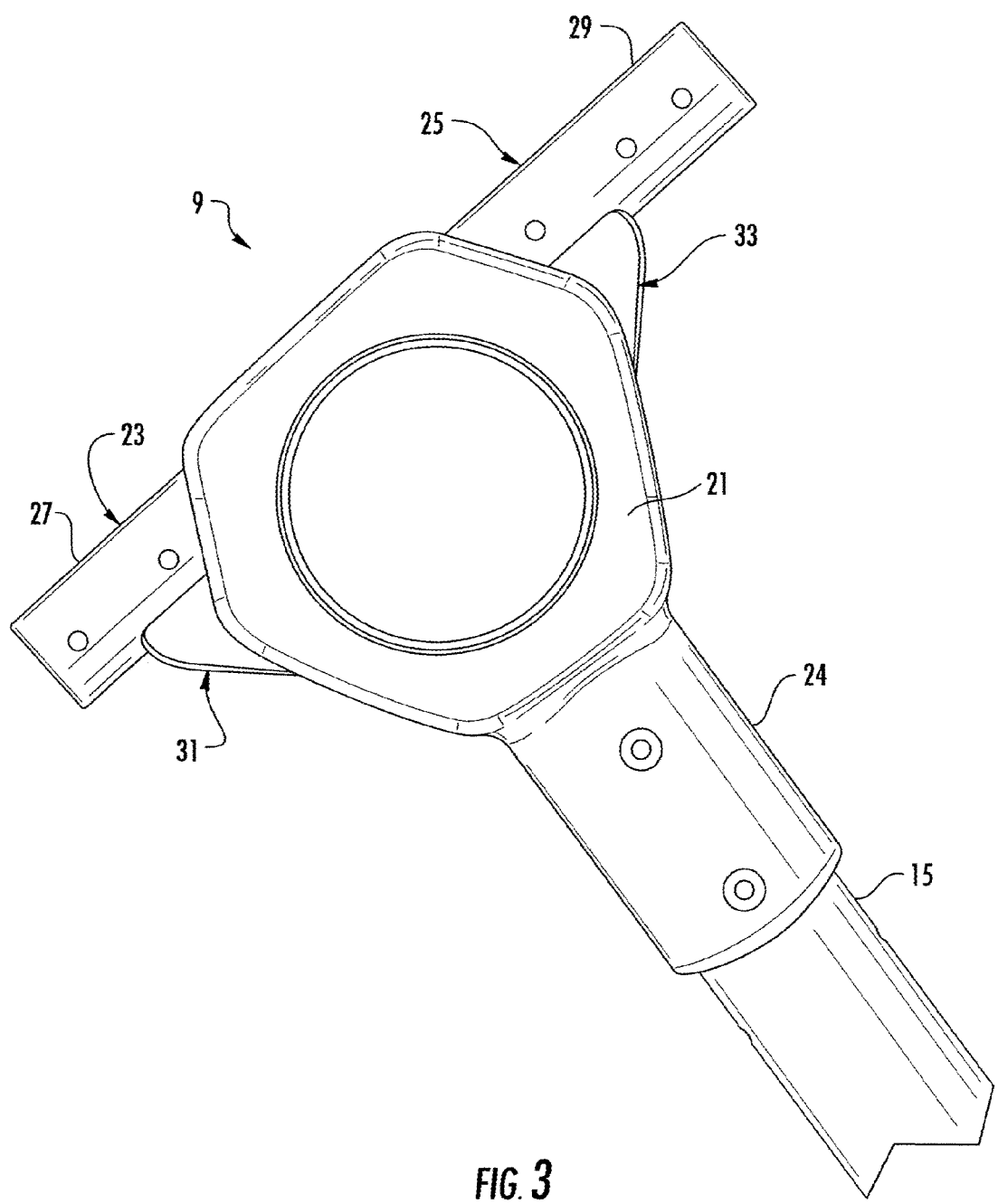
Figure 4:
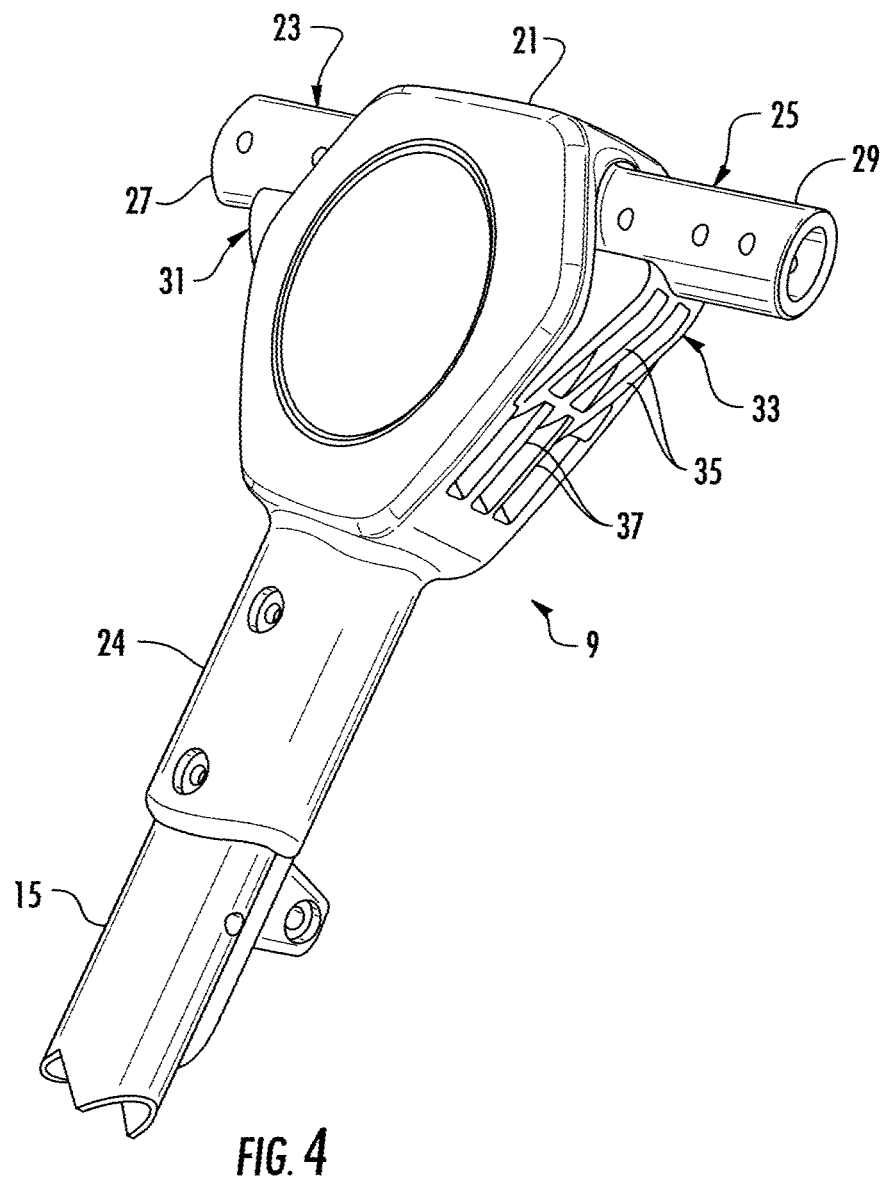
Figure 5:
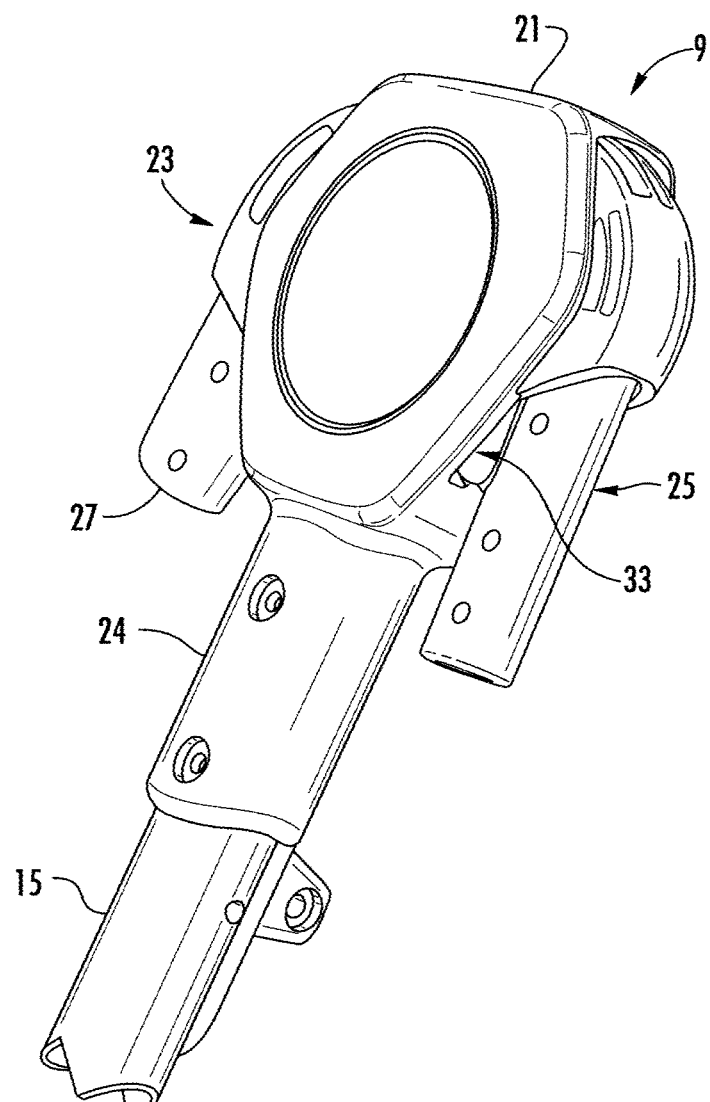
Figure 6:
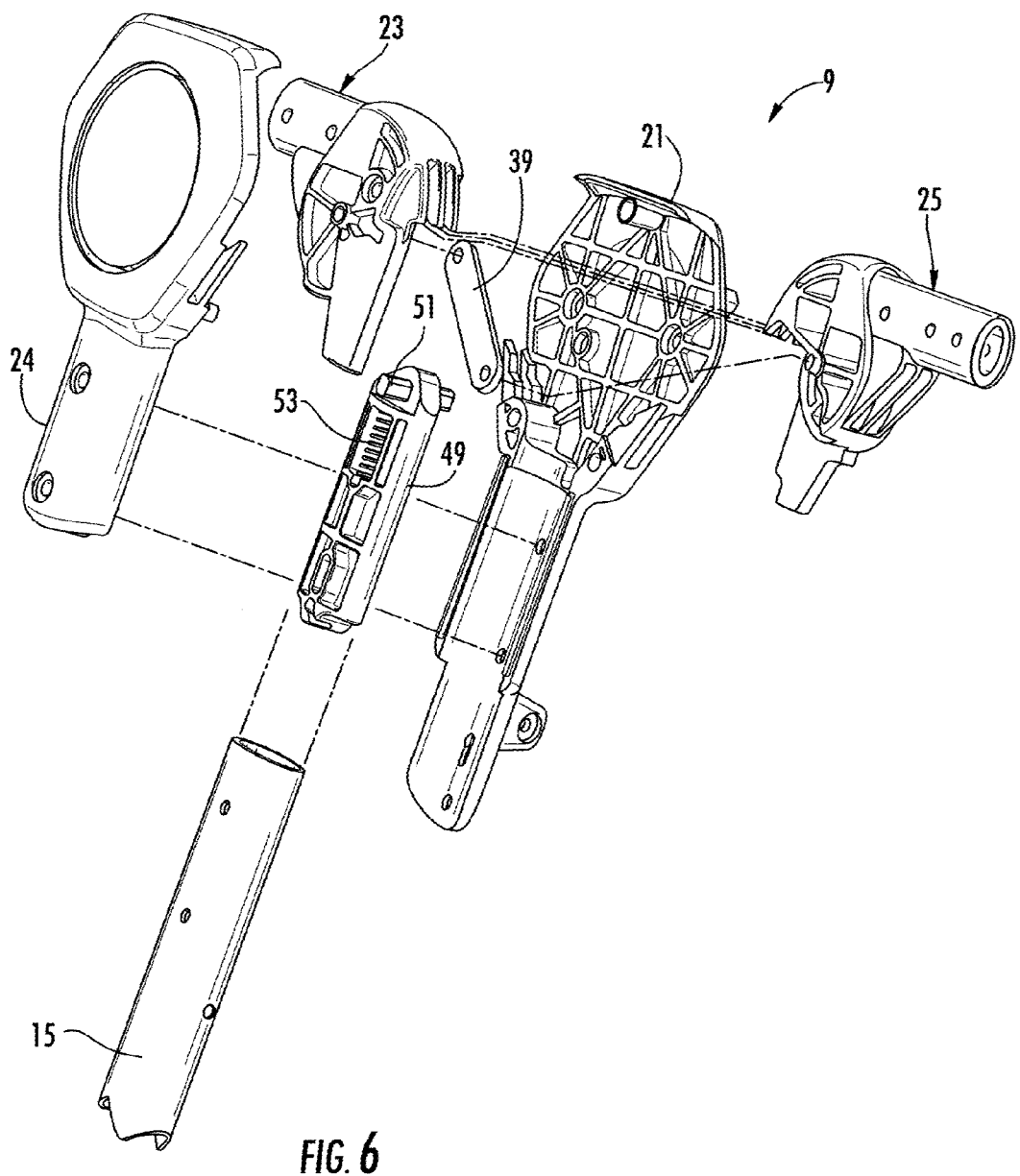
Figure 7:
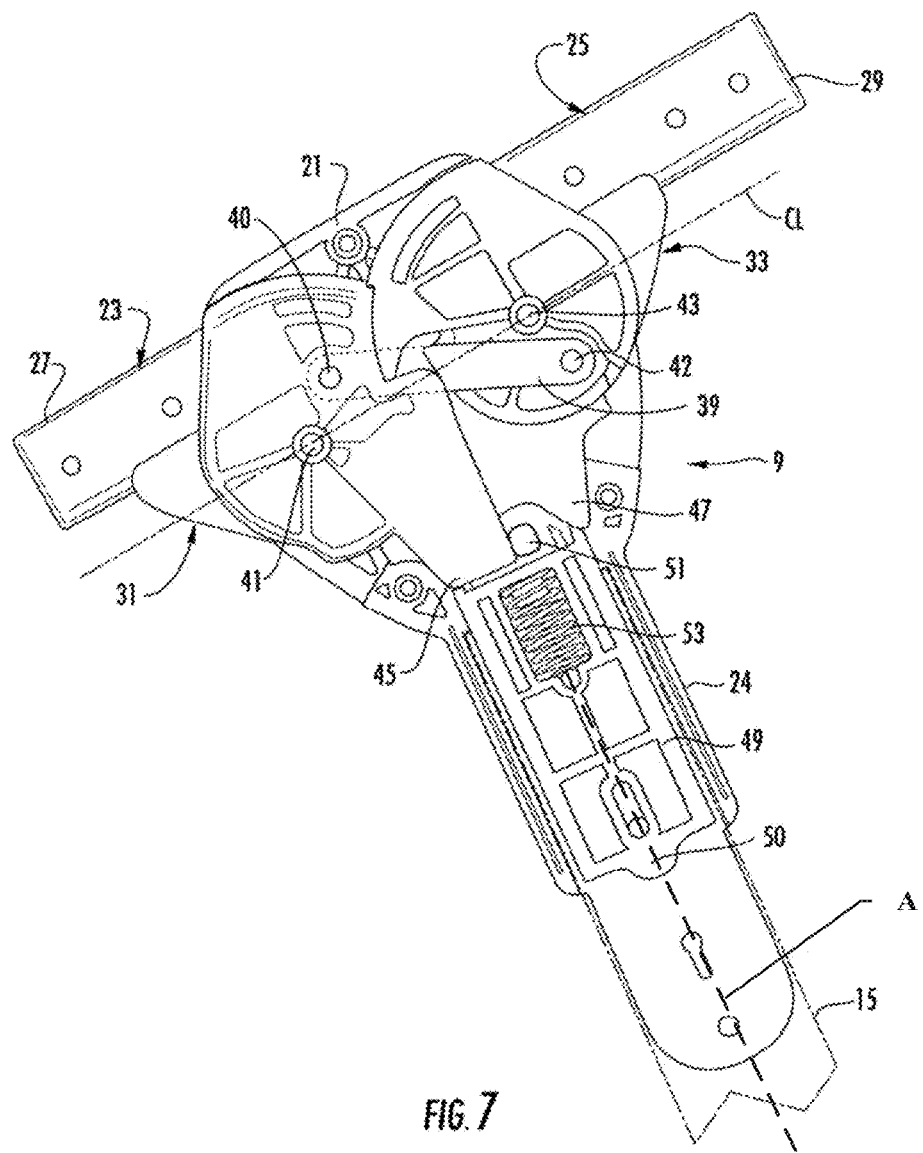
Figure 8:
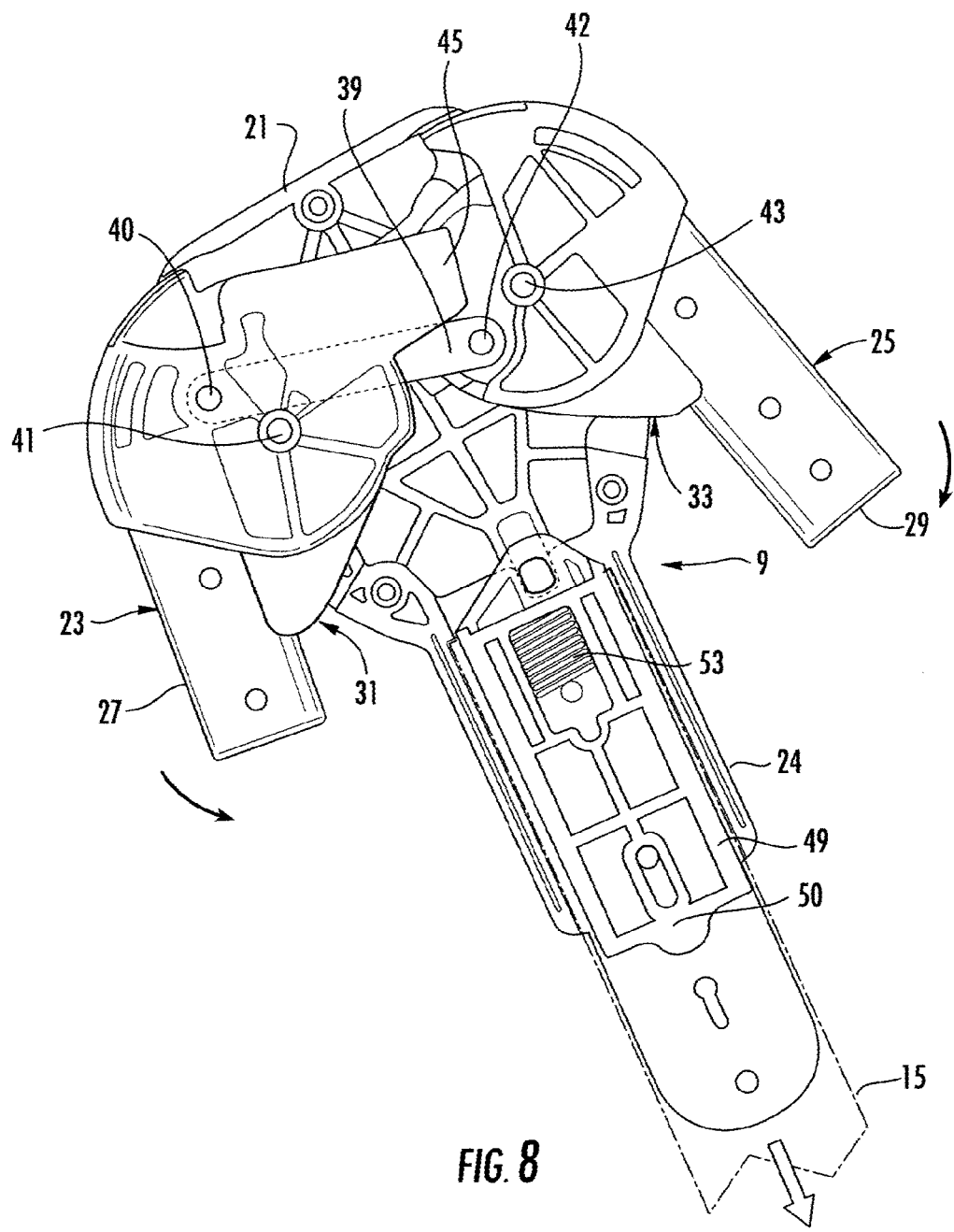
Figure 9:
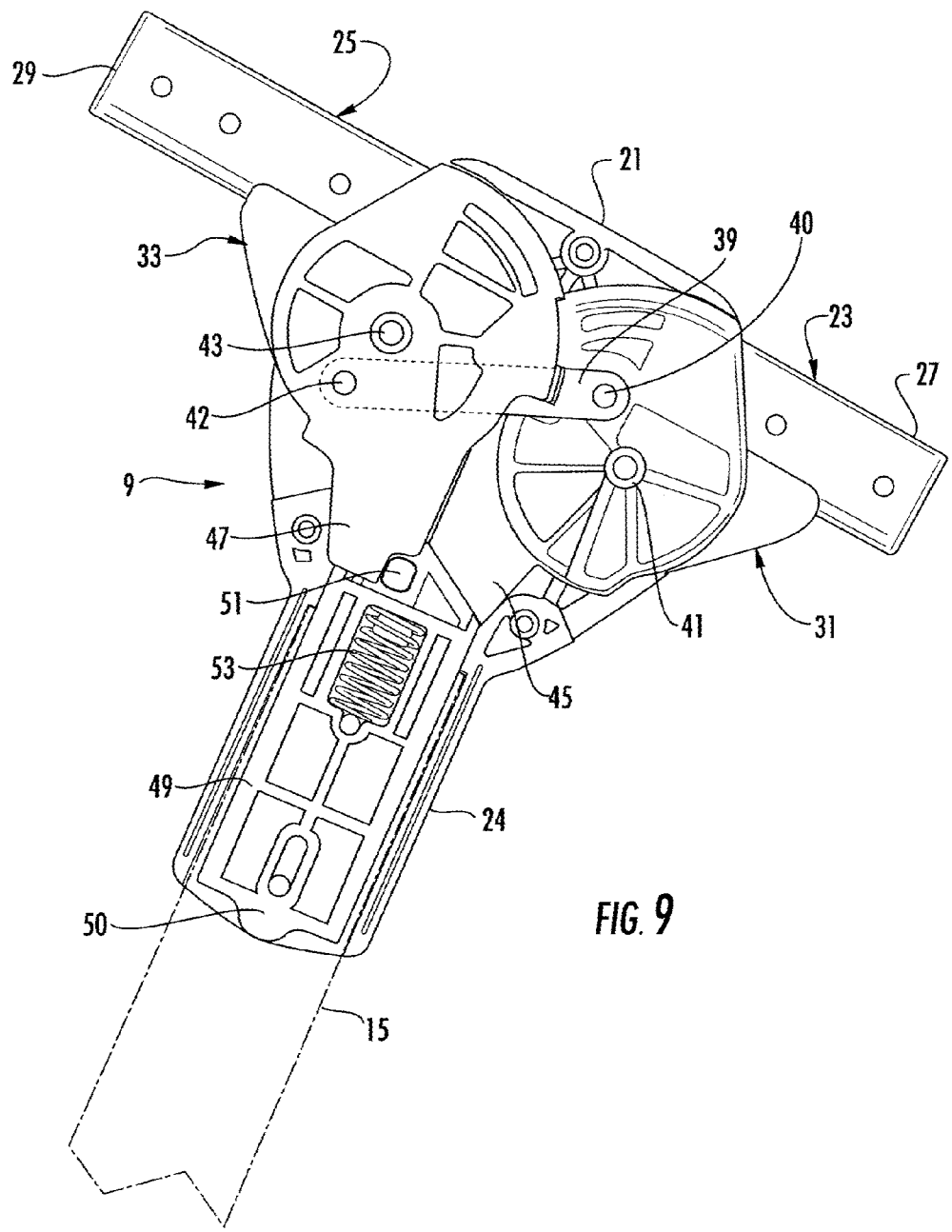
Figure 10:
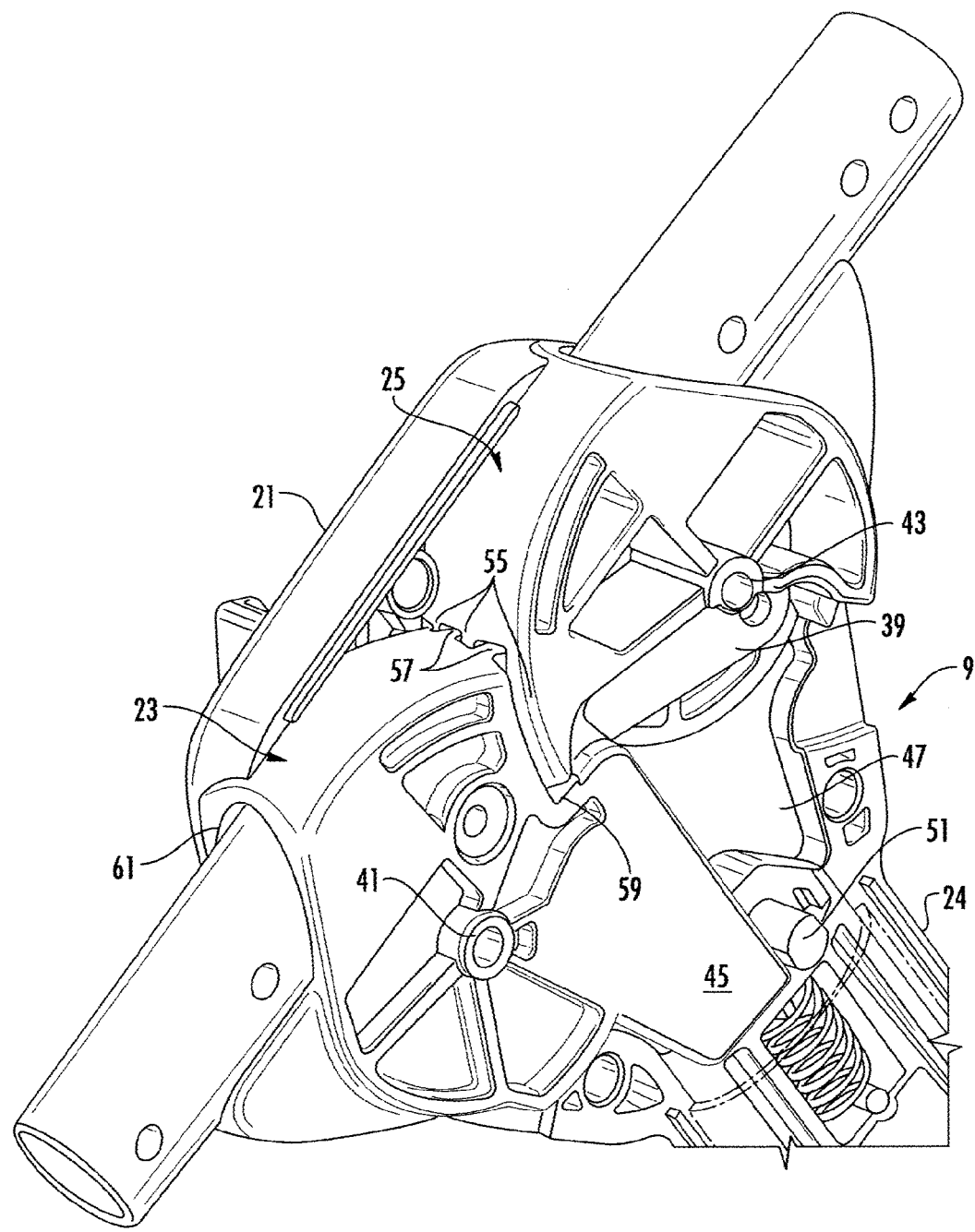
Figure 11:
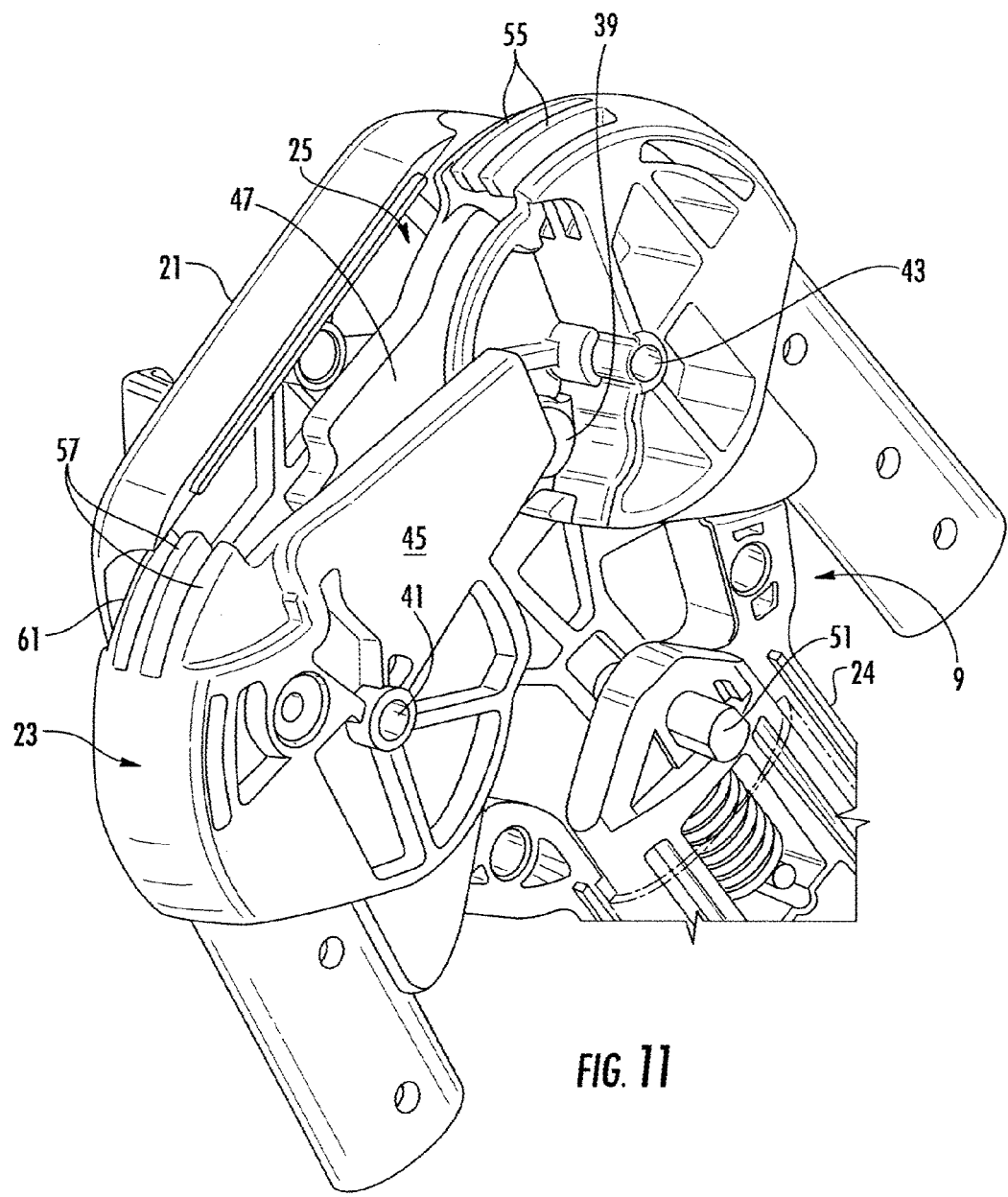
Figure 12:
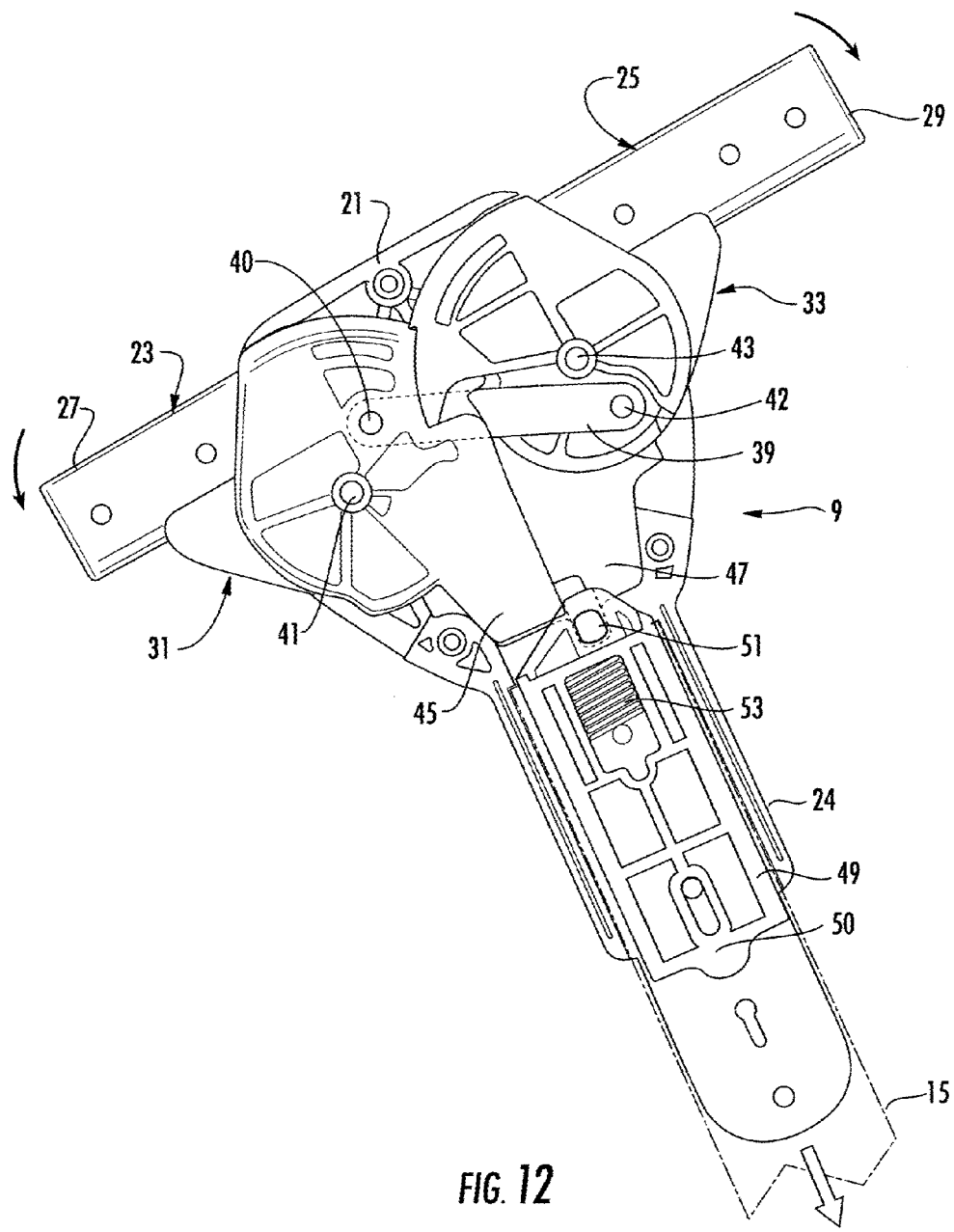
Figure 13:
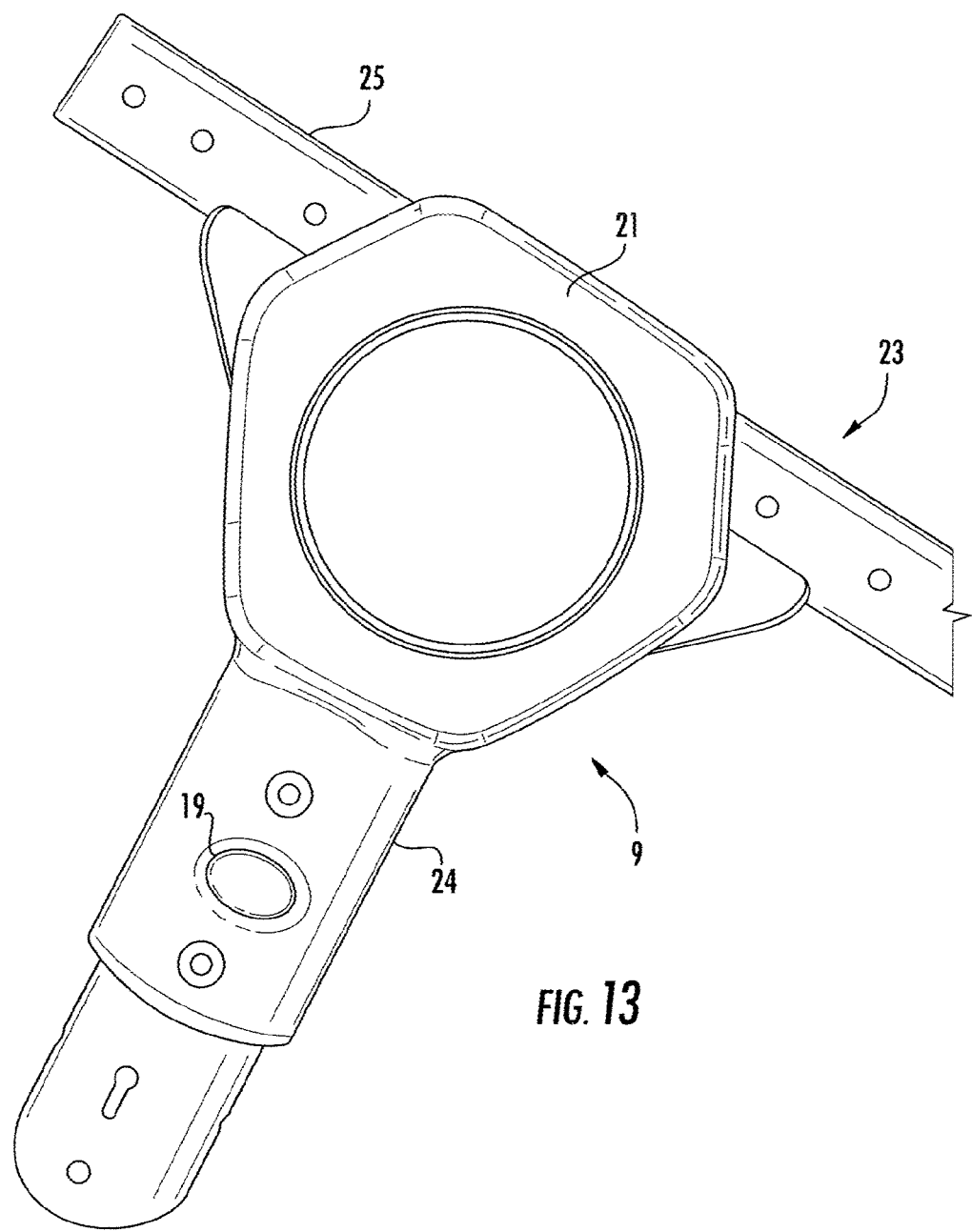
Figure 14:
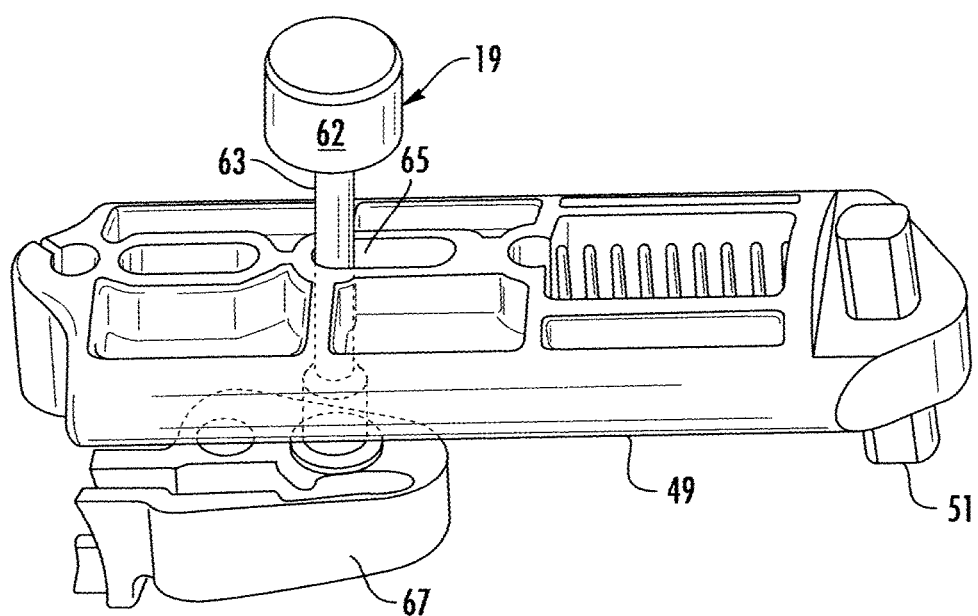
Figure 15:
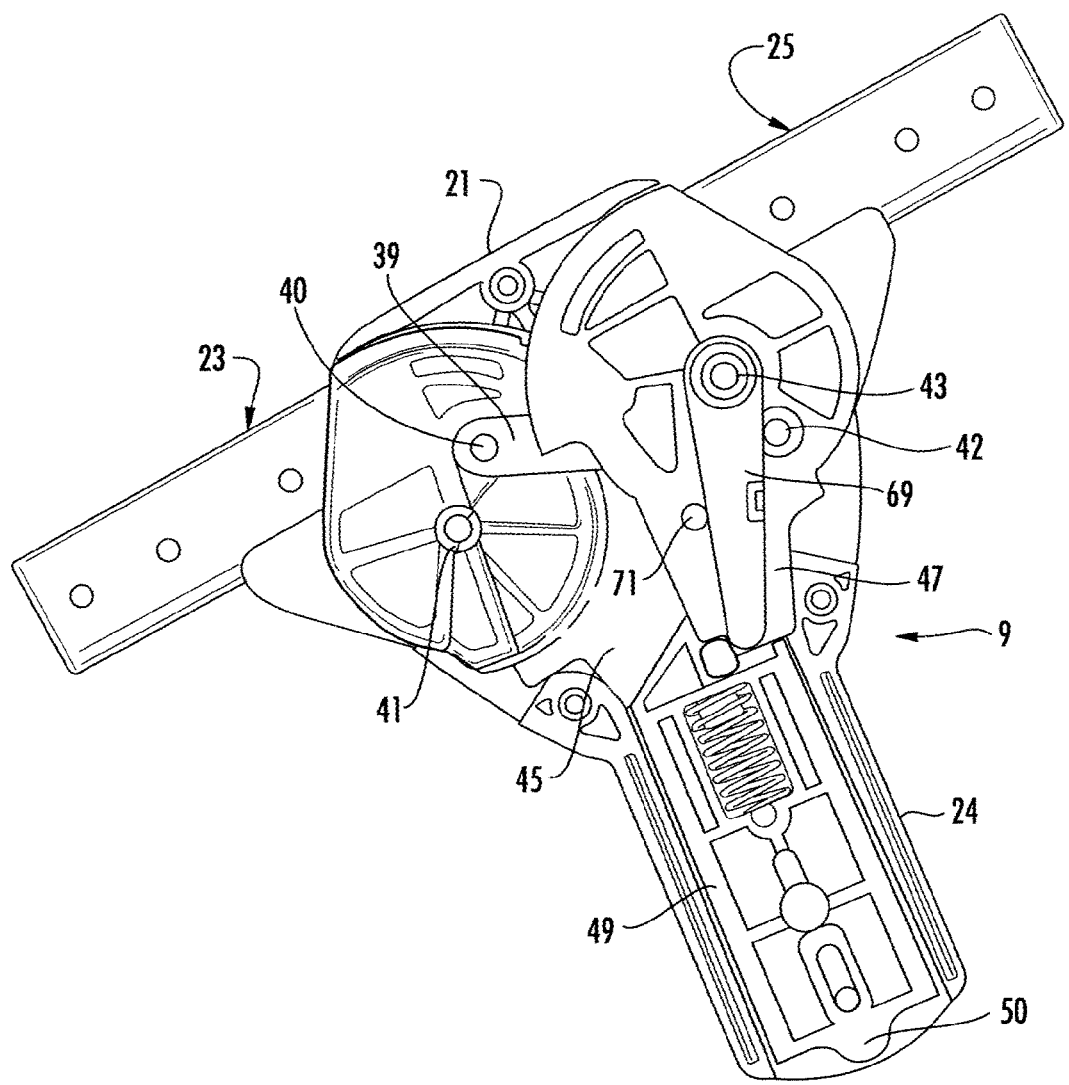
Figure 16:
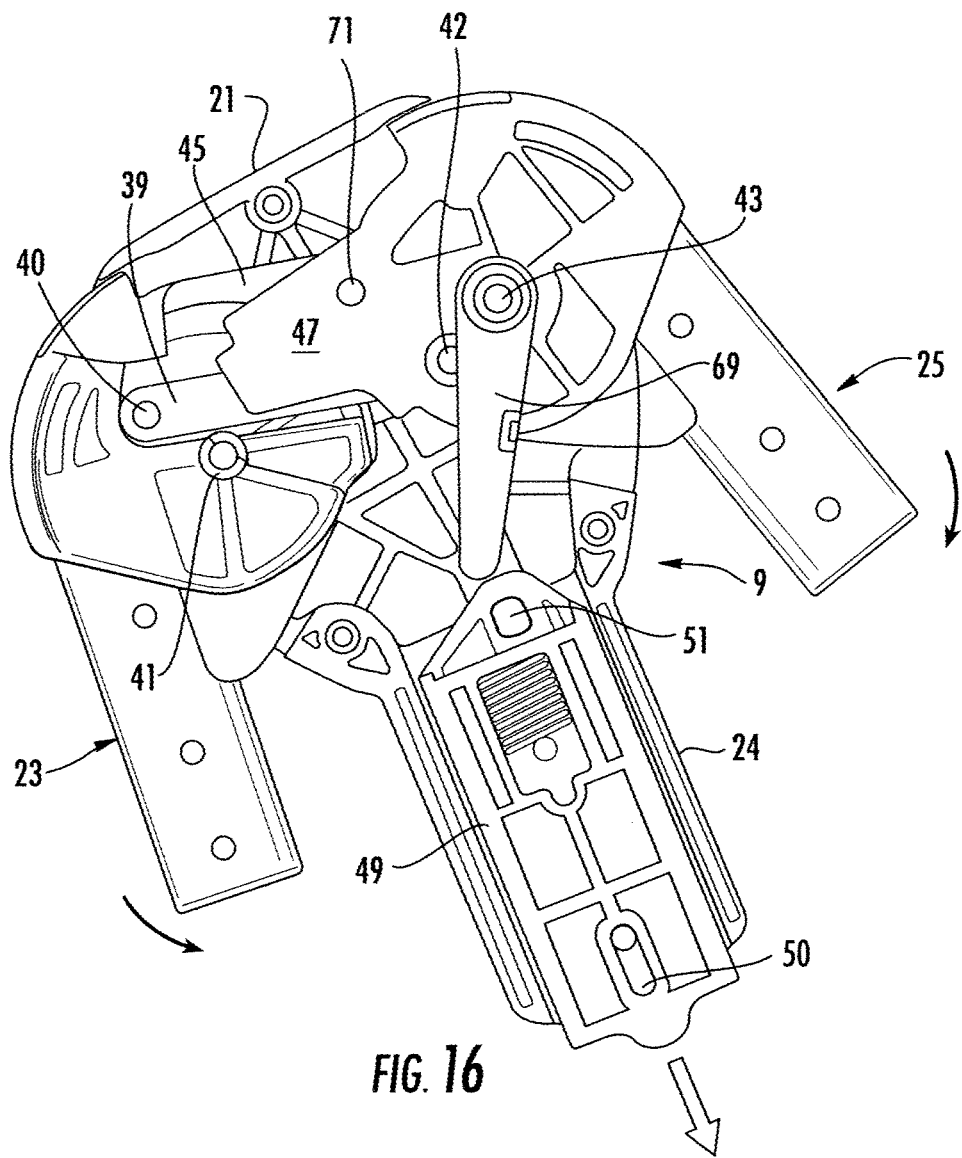
Figure 17:
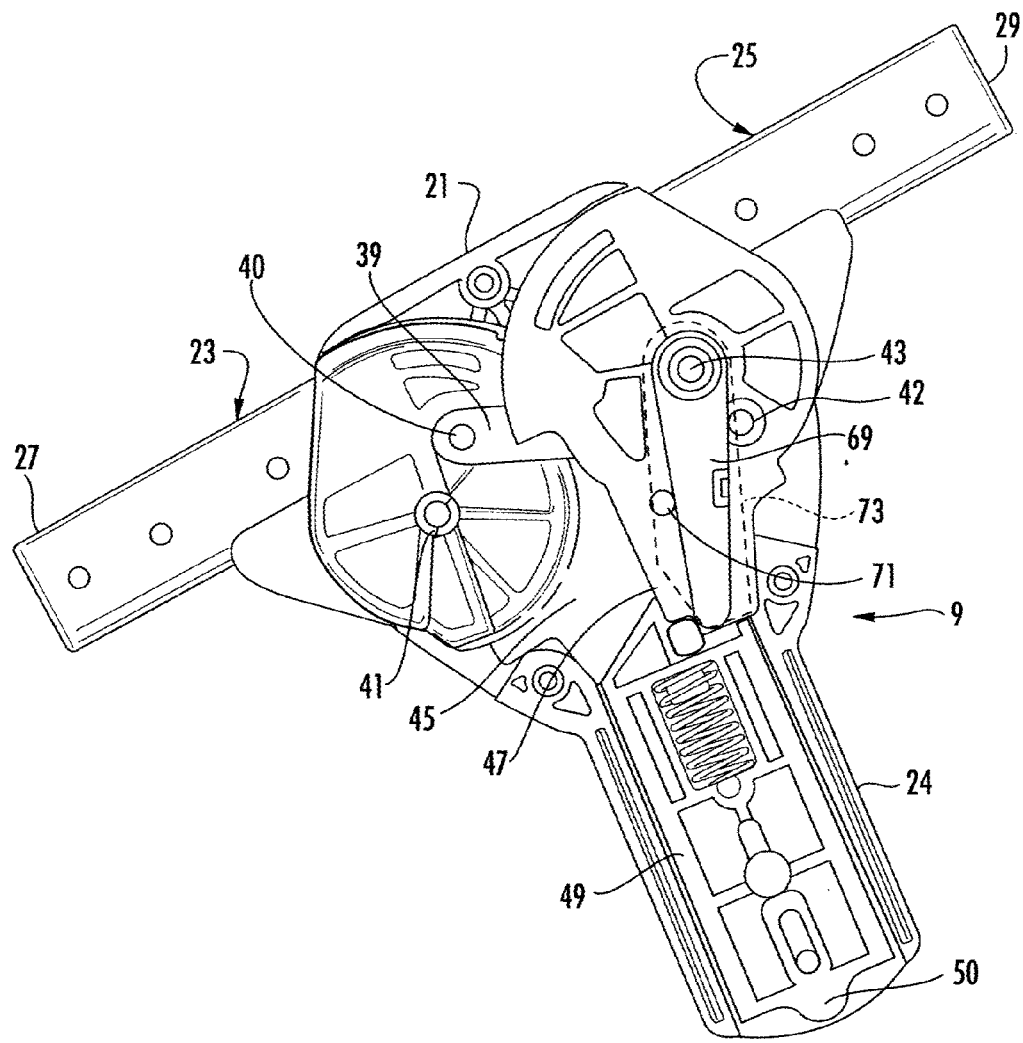

Having thus described the invention in general terms, reference will now be made to the accompanying drawings, which are not necessarily drawn to scale, and wherein:

FIG. 1 shows a perspective view of a stroller in accordance with an embodiment of the present invention;

FIG. 2 shows the stroller of FIG. 1 in a folded position in accordance with an embodiment of the present invention;

FIG. 3 shows a hinge for a stroller in an operational position in accordance with an embodiment of the present invention;

FIG. 4 shows a perspective view of the hinge of FIG. 3 in accordance with an embodiment of the present invention;

FIG. 5 shows the hinge of FIG. 4 in a folded position in accordance with an embodiment of the present invention;

FIG. 6 shows an exploded view of a hinge in accordance with an embodiment of the present invention;

FIG. 7 shows a hinge having a slide member in a locked position in accordance with an embodiment of the present invention having a portion of the housing removed for illustration purposes;

FIG. 8 shows the hinge of FIG. 7 in a folded position in accordance with an embodiment of the present invention;

FIG. 9 shows a rear view of a hinge in accordance with an embodiment of the present invention having a portion of the housing removed for illustration purposes;

FIG. 10 shows a close-up view of a hinge in accordance with an embodiment of the present invention having a portion of the housing removed for illustration purposes;

FIG. 11 shows the hinge of FIG. 10 in a folded position in accordance with an embodiment of the present invention;

FIG. 12 shows the hinge of FIG. 7 having the slide member in an unlocked position in accordance with an embodiment of the present invention and having a portion of the housing removed for illustration purposes;

FIG. 13 shows a hinge having a secondary locking mechanism in accordance with an embodiment of the present invention;

FIG. 14 shows a slide member of the hinge of FIG. 13 having a secondary locking mechanism in accordance with an embodiment of the present invention;

FIG. 15 shows a hinge having a lever in accordance with an embodiment of the present invention;

FIG. 16 shows the hinge of FIG. 15 moved into a folded position in accordance with an embodiment of the present invention; and FIG. 17 shows the hinge of FIG. 15 having a reinforcement member disposed within a pivoting hinge member in accordance with an embodiment of the present invention.

DETAILED DESCRIPTION

The present invention will now be described more fully hereinafter with reference to the accompanying drawings, in which some, but not all embodiments of the present invention are shown. Indeed, the present invention may be embodied in many different forms and should not be construed as limited to the embodiments set forth herein; rather, these embodiments are provided so that this disclosure will satisfy applicable legal requirements. As used herein, terms such as "left," "right," "top," "bottom," "upper," or "lower" are included for exemplary purposes to show only a relative location of certain features and should not be construed to limit the scope of the invention to a single direction. Like numbers refer to like elements throughout.

Referring to FIGS. 1-2, the stroller 1 according to some embodiments of the present invention may include a plurality of wheels 3, a handle 5, and a passenger support area 7 connected to a frame, which may be configured to fold at one or more hinges 9. Some embodiments of the stroller 1 may use two hinges disposed on either side of the passenger support area 7 near the middle of the stroller frame and at the intersection of a plurality of frame members or supports 11, 13, 15. The stroller 1 may be configured to fold approximately in half at the hinges 9, as shown in FIG. 2, in order to enable easier storage and transportation of the stroller when not in use.

The stroller 1 may have multiple supports 11, 13, 15 that connect to and pivot about the hinges 9. For example, in the embodiment shown in FIG. 1, a hinge 9 may be placed at the intersection of a front-wheel support 11, a rear-wheel support 15, and a handle support 5. In some embodiments, the front-wheel support 11 connects one or more hinges 9 with the front wheel(s) 3 of the stroller, the rear-wheel support 15 connects one or more hinges 9 with the rear wheel(s) 3 of the stroller, and the handle support 13 connects one or more hinges 9 with a handle 5 of the stroller. A hinge 9, as described herein, may be used at the intersection of any plurality of supports in order to facilitate folding of the stroller.

In some embodiments of the present invention, the stroller 1 may have an operational position, as shown in FIG. 1, in which the stroller is configured to receive a passenger, and a folded position, as shown in FIG. 2, in which the stroller is configured for storage or transportation. The hinges 9 of the stroller 1 may facilitate achieving the two positions of the stroller by holding the supports 11, 13, 15 in a substantially fixed configuration with the supports extended away from each other in the operational position. In this regard, the term "substantially fixed" should be understood to mean that there may be some typical play in the hinge within normal and acceptable engineering tolerances. Likewise, the hinges 9 may facilitate movement to the folding position by allowing the supports 11, 13, 15 to fold towards each other. In some embodiments, the stroller 1 includes a release member 17 that may be configured to release the hinges 9 from the operational position and allow the stroller to collapse into the folded position. As shown in FIG. 1, in some embodiments the release member 17 may be disposed in the passenger support area 7 between two hinges 9 in order to actuate both hinges at once. In some further embodiments, the release member 17 may be in the passenger support area 7 so that the user pulls from a center line of the stroller 1 in order to improve the folding action.

In some embodiments, the stroller 1 may include a secondary locking mechanism 19, which operates as a failsafe for the release member 17. As described in greater detail below, the secondary locking mechanism 19 may be a button or lever connected to one or more of the hinges 9 that may restrict the motion of the release member 17 until the secondary locking mechanism 19 is actuated. In some embodiments, one of a pair of hinges may include a secondary locking mechanism 19, or, alternatively, each hinge on the stroller may include a secondary locking mechanism 19.

Referring to FIG. 3 a hinge 9 may comprise a housing 21 and a plurality of pivoting hinge members 23, 25 configured to engage the supports 11, 13, 15 (shown in FIGS. 1-2). In some embodiments, each of the pivoting hinge members 23, 25 may be configured to connect the hinge to one or more supports. For example, in the embodiment shown in FIGS. 3-5, an engaging end 27 of the first pivoting hinge member 23 is configured to engage the front-wheel support 11 (shown in FIGS. 1-2). Likewise, in the embodiment shown in FIGS. 3-5, an engaging end 29 of the second pivoting hinge member 25 is configured to engage the handle support 13 (shown in FIGS. 1-2). FIGS. 3-4 depict an embodiment of the hinge 9 when the stroller is disposed in an operational position, and FIG. 5 depicts an embodiment of the hinge when the stroller is disposed in a folded position.

In some embodiments, an engaging portion of the housing 21 may be configured to fixedly engage one or more supports. For example, in the embodiment shown in FIGS. 3-5, the engaging portion 24 of the housing 21 may be configured to receive and hold the rear-wheel support 15. In some alternative embodiments, the housing 21 may engage any other desired portion of the stroller.

The supports 11, 13, 15 may be configured to connect to the hinge 9 by any means. For example, in some embodiments, the supports 11, 13 may slide over the engaging ends 27, 29 of the pivoting hinge members 23, 25 and be fastened to the pivoting hinge members using fasteners, such as screws, bolts, rivets, adhesives, or the like. In some embodiments, the engaging ends 27, 29 may surround the supports 11, 13 instead. The engaging ends 27, 29 may alternatively fasten to the side of the supports 11, 13, such as with screws or may attach via interlocking features. Likewise, the engaging portion 24 of the housing 21 may fasten to the center support 15 by surrounding the support, being inserted into the support, or by any type of fastener or interlocking features. The supports 11, 13, 15 may connect to the engaging ends 27, 29 and/or the engaging portion 24 by any type of fastening or interlocking means.

In some embodiments, the hinge 9 may be designed to prevent injury to a user, such as a parent or child, by limiting the number of pinch points on the exterior of the hinge. For example, in some embodiments, the housing 21 may enclose substantially all of the moving parts of the hinge 9. In the embodiment shown in FIGS. 3-4, a portion of the pivoting hinge members 23, 25 protrude from the sides of the housing. At an interface between the pivoting hinge members 23, 25 and the housing 21, the pivoting hinge members may have a guard 31, 33 comprising a plurality of guide features 35 extending from the pivoting hinge members toward the housing. The guide features 35 may be designed to engage corresponding guide features 37 on the housing 21, such that the pinch points are minimized between the pivoting hinge members 23, 25 and the housing by decreasing the open space that exists at the folding interface, thereby reducing the risk that a finger, article of clothing, etc. will accidentally be caught at the interface when the stroller is moved from the operational position toward the folded position.

FIG. 6 illustrates an exploded view of an example embodiment of the hinge 9. As shown in FIGS. 6-9, in some embodiments, the hinge 9 may include two pivoting hinge members 23, 25 that are pivotally connected to each other by a linking member 39. In some embodiments, the pivoting hinge members 23, 25 may be pivotally connected to the housing, such that configured to rotate about a first 41 and second 43 axis of rotation respectively. In some embodiments, the pivoting hinge members 23, 25 may at least partially overlap, but may rotate about different axes of rotation 41, 43. For example, as shown in FIG. 7, the pivoting hinge members 23, 25 may rotate within a plane about the axes of rotation 41, 43 extending perpendicular to the plane, such that at least portion of the hinge members overlap within the plane. The pivoting hinge members 23, 25 may, in other embodiments, be configured to abut so that they do not overlap but contact one another along an outer or perimeter edge of each of the pivoting hinge members. In yet some other embodiments, the pivoting hinge members 23, 25 may be spaced apart within the plane so that the hinge members do not overlap or abut.

In some embodiments, the first 23 and second 25 pivoting hinge members are configured to rotate in opposite directions. The pivoting hinge members 23, 25 may be further configured to mirror each other's motion, such that when the first pivoting hinge member 23 is rotated about the first axis of rotation 41, the second hinge member 25 is substantially simultaneously moved in the opposite direction about the second axis of rotation 43 (e.g., moved at the same time or almost the same time considering acceptable engineering tolerances in the manufacture and assembly of the hinge). In some embodiments, the pivoting hinge members 23, 25 are connected such that they remain substantially symmetrical to each other with respect to the engaging portion 24 of the housing 21. For example, in the embodiment shown in FIG. 7, the engaging ends 27, 29 of the pivoting hinge members 23, 25 are disposed at approximately the same angle relative to the engaging portion 24 of the housing 21. In the embodiment shown in FIG. 8, the pivoting hinge members 23, 25 are rotated into a folded position; however, each of the engaging ends 27, 29 of the pivoting hinge members are still disposed at approximately the same angle as the other.

In other embodiments, the angles between each of the pivoting hinge members 23, 25 and the engaging portion 24 may be different depending on the particular design of the stroller and the configuration of the linking member 39. For example, in some embodiments of the hinge, the first pivoting hinge member 23 may form a greater angle with respect to the engaging portion 24 than with respect to the second pivoting hinge member 24. Alternatively, the first pivoting hinge member 23 may form a smaller angle with the engaging portion 24 as compared to with the second pivoting hinge member 25. Additionally or alternatively, as discussed below, the pivoting hinge members 23, 25 may rotate at different speeds depending on the connection of the linking member 39, such that the difference between the angles of each hinge member may change as they rotate.

In some embodiments, the linking member 39 is configured to cause the pivoting hinge members 23, 25 to rotate in opposite directions. For example, in the embodiments shown in FIGS. 7-9, the axes of rotation 41, 43 of the pivoting hinge members 23, 25 define a center line CL connecting them. In the embodiments shown in FIGS. 7-9, the linking member 39 connects the first 23 and second 25 pivoting hinge members across the center line CL, such that when one of the pivoting hinge members rotates clockwise, the other is moved counter-clockwise, and vice versa.

In some embodiments, the linking member may connect to the first pivoting hinge member 23 at a first attachment point 40 at a first end of the linking member 39 and the second pivoting hinge member 25 at a second attachment point 42 at a second end of the linking member. The first attachment point 40 may be defined at the pivotal attachment between the first pivoting hinge member 23 and the linking member 39. Likewise, the second attachment point 42 may be defined at the pivotal attachment between the second pivoting hinge member 25 and the linking member 39. The distance between the centers of rotation 41, 43 and the respective attachment points 40, 42 of the linking member 39 may determine how much each pivoting hinge member 23, 25 rotates in response to a movement of the linking member. For example, in some embodiments, the distance between the first attachment point 40 and the first axis of rotation 41 determines the rotational displacement of the first pivoting hinge member 23 in response to the movement of the linking member 39. Likewise, in some embodiments the distance between the second end of the linking member 42 and the second axis of rotation 43 determines the rotational displacement of the second pivoting hinge member 25 in response to the movement of the linking member. In some embodiments the distance between the first attachment point 40 and the first axis of rotation 41 is the same as the distance between the second attachment point 42 and the second axis of rotation 43 in order to cause the pivoting hinge members 23, 25 to rotate symmetrically (e.g. with the same rotational displacement) with respect to each other. In some other embodiments, the distance between the first attachment point 40 and the first axis of rotation 41 may be different than the distance between the second attachment point 42 and the second axis of rotation 43 to cause one of the pivoting hinge members 23, 25 to rotate through a larger angle than the other.

With reference to FIGS. 6-9, some embodiments of the present invention may include a slide member 49 configured to engage at least one of the first 23 and second 25 pivoting hinge members. In some embodiments, the slide member 49 is configured to lock the pivoting hinge members in the operational position, for example, as shown in FIG. 7. In some embodiments, as shown in FIGS. 8 and 12, the pivoting hinge members 23, 25 may be allowed to rotate when the slide member 49 is moved into an unlocked position.

In some embodiments, when the sliding member 49 is in a locked position, the sliding member 49 engages either or both of a first protrusion 45 of the first pivoting hinge member 23 and a second protrusion 47 of the second pivoting hinge member 25. In some embodiments, the slide member 49 only engages one of the two pivoting hinge members 23, 25, and the movement of the other pivoting hinge member is controlled by the linking member 39 connecting the two pivoting hinge members. In some other embodiments, the slide member 49 engages both of the pivoting hinge members 23, 25 when disposed in the locked position. In some embodiments, the protrusions 45, 47 may be disposed at any angle on the pivoting hinge members 23, 25.

In some embodiments, the slide member 49 is configured to slide linearly along a longitudinal axis A between the locked position and the unlocked position. In some further embodiments, the slide member 49 is at least partially disposed within the housing 21. For example, in the embodiment shown in FIGS. 7-9, the slide member 49 is disposed substantially within the engaging portion 24 of the housing 21 when in the locked position, but may protrude from the housing at a lower end 50 of the slide member 49. In some embodiments, the slide member 49 may be substantially disposed within both the housing 21 and the rear-wheel support 15. In some alternative embodiments, the slide member 49 may be disposed in or on one of the other supports 11, 13.

In some embodiments, the slide member 49 may define any shape that is able to engage one or both of the pivoting hinge members. For example, the end of the slide member 49 may have a shape that is complementary to the shape of either or both protrusions 45, 47 on the pivoting hinge members 23, 25, such that the protrusions are able to rotate into engaging contact with the slide member. The slide member 49 may define recesses or grooves that are configured to engage the one or more protrusions 45, 47, or alternatively, may define projections or various other structures that are configured to engage the protrusions.

In some embodiments, the slide member 49 may define a pin 51 at one end for engaging the pivoting hinge members 23, 25, for example as shown in FIG. 7. The term pin 51, as used herein, may refer to any protruding shape or contour, such as cylinder, peg, or any other extension that may engage and limit the movement of the pivoting hinge members 23, 25 such that the hinge is held in the operational position. In some embodiments, the pin 51 may protrude from both sides of the slide member 49 (e.g., out of the page and into the page with reference to FIG. 7) in order to engage both the first protrusion 45 and the second protrusion 47 of the pivoting hinge members 23, 25. The pin 51 may be attached to the slide member 49 such that the pin moves linearly along the longitudinal axis A with the slide member 49.

In some embodiments, the protrusions 45, 47 may be configured to engage the slide member 49 in a rotational direction about the respective axes of rotation 41, 43 of each pivoting hinge member 23, 25. For example, as shown in FIG. 7, the protrusion 45 of the pivoting hinge member 23 may contact the pin 51 of the slide member 49 with a side edge. In some other embodiments, the protrusions 45, 47 may be configured to engage the slide member 49 in an radial and a rotational direction. For example, as shown in FIG. 9, the protrusion 47 of the pivoting hinge member 25 may define a notch that engages the pin 51 of the slide member 49 on a top and side surface. Some embodiments of the present invention may use a combination of the two protrusions, for example as shown in FIGS. 7-9, such that at least one protrusion is configured to limit the motion of the slide member 49 along the longitudinal axis A.

In some embodiments, the slide member 49 may have a cable or other connector (not shown) attached to the lower end 50 such that the cable is configured to pull the slide member towards the unlocked position. As shown in FIG. 12, the slide member 49 may be moved into the unlocked position by an actuation of the cable, such that the pin 51 disengages from the pivoting hinge members 23, 25 and allows the pivoting hinge members to be moved from the operational position toward the folding position. As discussed above, the cable may be connected to the release member 17 (shown in FIG. 1) on a stroller. As will be discussed below, in some embodiments, the hinge may have a secondary locking mechanism that stops the sliding member 49 from disengaging from the locked position until the secondary locking mechanism has been actuated. As also discussed in greater detail below, in some embodiments, the slide member 49 may move linearly away from the protrusions 45, 47 for as long as is necessary to rotate the pivoting hinge members 23, 25 towards the folded position. In some embodiments, the slide member 49 may return to the locked position after the pivoting hinge members 23, 25 are moved towards the folded position, and in other embodiments, the slide member 49 may be maintained in the unlocked position until the pivoting hinge members 23, 25 are rotated back into the operational position.

In some embodiments, the slide member 49 may have a bias member 53 disposed between the slide member and the housing 21. The bias member 53 may apply a biasing force to the slide member 49 in order to urge the slide member towards the locked position. In some embodiments, the bias member 53 may be a spring, such as in the embodiment shown in FIGS. 6-9. In other embodiments, the bias member may be a tensioning cable, leaf spring, or any other biasing mechanism that could urge the slide member 49 towards the locked position.

In some embodiments, the slide member 49 and pivoting hinge members 23, 25 may be configured to move within a plane of the hinge, such that their motion is limited to two dimensions. As discussed above, in some embodiments, the pivoting hinge members 23, 25 may move between the operational position (e.g., shown in FIG. 7) and the folded position (e.g., shown in FIG. 8). In some embodiments, the folded position may correspond to the position in which the engaging ends 27, 29 of the pivoting hinge members 23, 25 are closest to the engaging portion of the housing 24. In some embodiments, in the operational position, the engaging end 27 of the first pivoting hinge member 23 and the engaging end 29 of the second pivoting hinge member 25 may form an angle of approximately one hundred and eighty degrees.

Any of the features of the hinge 9 may be configured to limit the motion of the pivoting hinge members 23, 25 between the operational position and the folded position. In some embodiments, the housing 21 may limit the motion of the pivoting hinge members. For example, in some embodiments, the operational position may be achieved when the pivoting hinge members 23, 25 make contact with the top of the housing 21. Likewise, the folding position may be achieved when the pivoting hinge members make contact with the housing near the engaging portion 24. In some embodiments, the operational position and folded position may be achieved when the protrusions 45, 47 contact the interior surfaces of the housing 21.

With reference to FIG. 10, in some embodiments, the operational position of the hinge 9 may be determined by the first pivoting hinge member 23 contacting the second pivoting hinge member 25. In some embodiments, the second pivoting hinge member 25 may have a plurality of guide features 55 configured to slidably engage a corresponding plurality of guide features 57 on the first pivoting hinge member 23. The guide features 55, 57 may interlock and stabilize the rotation of the pivoting hinge members 23, 25. In some embodiments, the guide features 55, 57 of the pivoting hinge members 23, 25 engage each other when the pivoting hinge members are in the operational position. In some embodiments, at least one guide feature 55 of the second pivoting hinge member 25 may be configured to contact a stopping point 59 of the first pivoting hinge member 23 when the second pivoting hinge member is in an operational position. Likewise, in some embodiments, at least one guide feature 57 of the first pivoting hinge member 23 may be configured to contact a stopping point (not shown) of the second pivoting hinge member 25 when the second pivoting hinge member is in an operational position.

In any of the embodiments discussed above, the housing 21 or pivoting hinge members 23, 25 may limit the rotation of the pivoting hinge members in at least one rotational direction in the operational position. In some embodiments, the slide member 49 may limit the rotation of the pivoting hinge members 23, 25 in at least one other rotational direction. In some embodiments, the slide member 49 may be configured to limit the rotation of the pivoting hinge members 23, 25 in both rotational directions while the pivoting hinge members are in the operational position.

As shown in FIG. 10, in some embodiments, the pivoting hinge members 23, 25 may define circular channels 61 that are configured to receive the supports 11, 13, 15 (shown in FIGS. 1-2) of the stroller.

In some embodiments of the present invention, as discussed above, the hinge 9 may include a secondary locking mechanism 19 configured to hold the sliding member 49 in a locked position until the secondary locking mechanism is released by a user. The secondary locking mechanism 19, as shown in FIG. 13, may serve as a failsafe for the primary release member 17 to ensure that the stroller does not accidentally fold or collapse while a passenger is seated in the passenger support area 7. FIG. 14 shows a slide member 49 in accordance with some embodiments of the present invention having a secondary locking mechanism 19 connected thereto. The secondary locking mechanism 19 may define a button 62 or other actuating device, which may be connected to the slide member 49 via a rod 63, pin, or lever. The rod 63 may be configured to have multiple diameters along its length. For example, the rod 63 in FIG. 14 has a narrow diameter at an end proximate the button 62 and a wider diameter an end distal from the button 62. In some embodiments, the multiple diameters of the rod may correspond to a slot 65 in the slide member 49. For example, in the embodiment shown in FIG. 14, the narrow diameter of the rod 63 may correspond to a narrow slot 65 in the slide member 49, and the wide diameter of the rode may correspond to a wider section of the slot 65 in the slide member.

In some embodiments, when the wide diameter of the rod 63 is engaged with the wider section of the slide member 49, the slide member may be unable to slide along the longitudinal axis A. In some further embodiments, when the button 62 is actuated, the wide diameter of the rod 63 may disengage from the slide member 49 and allow the slide member to move along the longitudinal axis A with the narrow diameter of the rod 63 moving in the narrow slot 65 in the slide member.

Some embodiments of the present invention may include a tab, or end cap 67 configured to urge the secondary locking mechanism 19 into an engaged position with the slide member 49 in order to restrict the movement of the slide member. In some embodiments, the end cap 67 may have a peg or actuating device (not shown) that is configured to urge the wide diameter of the rod 62 into engagement with the slide member 49. The actuating device of the end cap 67 may be configured to reset the secondary locking mechanism 19 in response to an actuation by the user. For example, with reference to FIG. 14, when the secondary locking mechanism 19 is actuated, a distal end of the rod 63 may be disposed proximate the end cap 67. The actuating device of the end cap 67 may engage the distal end of the rod 63 and urge the distal end of the rod further into the slide member 49 in order to engage the wide diameter of the rod 63 with the slide member 49. In some further embodiments, the actuating device of the end cap 67 may be connected to the primary release member 17 of the stroller such that upon actuating the release member and allowing the hinge 9 to move from the operational position, the release member may also push the secondary locking mechanism 19 into engagement with the slide member 49.

With reference to FIGS. 15-17, some embodiments of the present invention include a lever 69 that maintains the pin 51 and the slide member 49 in the unlocked position while the pivoting hinge members 23, 25 are not in the operational position. In some embodiments the lever 69 may be attached to either or both of the housing 21 and one of the two pivoting hinge members 23, 25 by a first end of the lever at an axis of rotation 41, 43 of the respective pivoting hinge member. Some embodiments of the lever 69 include a spring or other biasing member (not shown) to urge the lever towards the slide member 49.

In some embodiments, the lever 69 may rotate about the axis of rotation 41, 43 of one of the pivoting hinge members 23, 25 in order to engage the slide member 49. For example, in the embodiment shown in FIG. 16, the slide member 49 is in the unlocked (downward) position and the lever 69 is engaged with the pin 51. In the embodiment shown in FIG. 16, the pin 51 and thereby the slide member 49 are prevented from moving into the locked position (upward) by the lever 69. When the pivoting hinge members 23, 25 are moved into the operational position, as shown in FIG. 15, a post 71 on one of the pivoting hinge members may contact and deflect the lever 69 away from the slide member 49. The biasing member (not shown) of the lever 69 may provide constant resistance to the lever 69 such that the lever is urged towards an engaged position with the slide member 49. In some further embodiments, the lever 69 may rest against a side of the pin 51 or the side of the post 71 when the slide member is in the locked position. As shown in FIGS. 15-16, the lever may pivot into alignment with and maintain the slide member 49 in the unlocked position when the pivoting hinge members 23, 25 are moved towards the folded position from the operational position.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purpose of limitation.

What is claimed is:

1. A hinge for a stroller comprising:
a housing;
a first pivoting hinge member pivotally connected to the housing and being configured to rotate about a first axis of rotation, wherein the first pivoting hinge member includes a first protrusion;
a second pivoting hinge member pivotally connected to the housing and being configured to rotate about a second axis of rotation, wherein the second pivoting hinge member includes a second protrusion, and wherein the second axis of rotation is different from the first axis of rotation;
a linking member pivotally attached to the first pivoting hinge member and the second pivoting hinge member such that the first and second pivoting hinge members are configured to rotate substantially simultaneously in opposite directions in a plane, the first pivoting hinge member and the second pivoting hinge member partially overlapping in the plane; and
a slide member at least partially received within the housing, wherein the slide member defines a longitudinal axis and is configured to move along the longitudinal axis between a locked position and an unlocked position;
wherein the slide member is configured to engage at least one of the first protrusion or the second protrusion in the locked position, wherein in the locked position the first pivoting hinge member and the second pivoting hinge member are pivotally fixed with respect to each other, and
wherein the first pivoting hinge member further comprises at least one guide slot defined in a first perimeter surface of the first pivoting hinge member and the second pivoting hinge member further comprises at least one guide feature defined in a second perimeter surface, wherein the at least one guide slot is configured to slidingly engage the at least one guide feature.

2. The hinge of claim 1, wherein the slide member defines a pin at an end of the slide member proximate the first and second pivoting hinge members such that the pin engages at least one of the first protrusion or the second protrusion in the locked position.

3. The hinge of claim 1, wherein the linking member defines a first end and a second end, wherein the first end is pivotally connected to the first pivoting hinge member and the second end is pivotally connected to the second pivoting hinge member.

4. The hinge of claim 1, wherein the first axis of rotation is parallel to the second axis of rotation.

5. The hinge of claim 1, wherein the slide member is biased toward the locked position by a biasing member.

6. The hinge of claim 1, wherein the slide member is configured to be moved from the locked position to the unlocked position by a release member on the stroller, wherein the release member is actuatable by a user.

7. The hinge of claim 1, wherein the first pivoting hinge member defines a first engaging end and the second pivoting hinge member defines a second engaging end; wherein the first engaging end is configured to engage a first support of the stroller and the second engaging end is configured to engage a second support of the stroller; and wherein the housing is configured to engage a center support of the stroller.

8. The hinge of claim 7, wherein the slide member is configured to slide along the longitudinal axis within the center support of the stroller.

9. The hinge of claim 7, wherein the first and second pivoting hinge members are configured to move between an operational position, in which the hinge is configured to extend the first and second supports of the stroller in opposite directions, and a folded position in which the hinge is configured to dispose the first and second supports proximate the slide member.

10. The hinge of claim 1, wherein the at least one guide slot and the at least one guide feature cooperate to define a limiting position of the hinge, wherein in the limiting position the at least one guide slot and the at least one guide feature engage to preclude rotation of each of the first and second pivoting hinge members in at least one respective rotational direction.

11. The hinge of claim 1, further comprising a secondary locking mechanism configured to hold the slide member in the locked position, wherein the secondary locking mechanism is configured to be released upon actuation by the user.

12. A foldable stroller comprising:
a front-wheel support;
a rear-wheel support;
a handle support; and
a pair of hinges connecting the front-wheel support, the rear-wheel support, and the handle support such that the stroller is movable between an operational position and a folded position, wherein each hinge comprises:
a housing;
a first pivoting hinge member pivotally connected to the housing and being configured to rotate about a first axis of rotation, wherein the first pivoting hinge member includes a first protrusion;
a second pivoting hinge member pivotally connected to the housing and being configured to rotate about a second axis of rotation, wherein the second pivoting hinge member includes a second protrusion, and wherein the second axis of rotation is different from the first axis of rotation;
a linking member pivotally attached to the first pivoting hinge member and the second pivoting hinge member such that the first and second pivoting hinge members are configured to rotate substantially simultaneously in opposite directions in a plane, the first pivoting hinge member and the second pivoting hinge member partially overlapping in the plane; and
a slide member at least partially received within the housing, wherein the slide member defines a longitudinal axis and is configured to move along the longitudinal axis between a locked position and an unlocked position;
wherein the slide member is configured to engage at least one of the first protrusion or the second protrusion in the locked position, wherein in the locked position the first pivoting hinge member and the second pivoting hinge member are pivotally fixed with respect to each other, and
wherein the first pivoting hinge member further comprises at least one guide slot defined in a first perimeter surface of the first pivoting hinge member and the second pivoting hinge member further comprises at least one guide feature defined in a second perimeter surface, wherein the at least one guide slot is configured to slidingly engage the at least one guide feature.

13. The foldable stroller of claim 12, wherein the slide member of each hinge defines a pin at an end of the slide member proximate the first and second pivoting hinge members such that the pin engages at least one of the first protrusion or the second protrusion in the locked position.

14. The foldable stroller of claim 12, wherein the linking member of each hinge defines a first end and a second end, wherein the first end is pivotally connected to the first pivoting hinge member and the second end is pivotally connected to the second pivoting hinge member.

15. The foldable stroller of claim 12, wherein the first axis of rotation is parallel to the second axis of rotation.

16. The foldable stroller of claim 12, wherein the slide member of each hinge is biased toward the locked position by a biasing member.

17. The foldable stroller of claim 12, wherein the slide member of each hinge is configured to be moved from the locked position to the unlocked position by a release member on the stroller, wherein the release member is actuatable by a user.

18. The foldable stroller of claim 12, wherein each hinge further comprises a lever pivotally connected to one of the first or second pivoting hinge members, wherein the lever is configured to maintain the slide member in the unlocked position when the first and second pivoting hinge members are in the folded position.

19. The foldable stroller of claim 18, wherein the lever of each hinge is configured to be disengaged from the slide member to allow the slide member to move toward the locked position when the first and second pivoting hinge members are moved toward the operational position.

* * * * *